United States Patent [19]
Wright

[11] Patent Number: 5,375,899
[45] Date of Patent: Dec. 27, 1994

[54] MOBILE DISPLAY PAVILION

[76] Inventor: Jack R. Wright, Box DD, Kimberly, Id. 83341

[21] Appl. No.: 81,010

[22] Filed: Jun. 21, 1993

[51] Int. Cl.5 .......................................... B60P 3/025
[52] U.S. Cl. ................................. 296/21; 52/7; 52/69; 52/79.5; 414/537; 296/26
[58] Field of Search ............... 52/79.5, 69, 143, 7; 135/87, 88, 89; 414/537; 296/21, 26, 163; 280/656

[56] References Cited

U.S. PATENT DOCUMENTS

| | | | |
|---|---|---|---|
| 1,156,693 | 10/1915 | Koger | 52/79.5 |
| 2,718,431 | 9/1955 | Pietroroia | 414/537 |
| 3,181,203 | 5/1965 | Wenger . | |
| 3,217,366 | 11/1965 | Wenger | 52/69 |
| 3,319,811 | 5/1967 | Martin, Jr. | 414/537 |
| 3,620,564 | 11/1971 | Wenger | 52/69 |
| 4,198,187 | 4/1980 | Mountz | 414/537 |
| 4,455,119 | 6/1984 | Smith | 414/537 |
| 4,720,945 | 1/1988 | Berranger et al. . | |
| 4,958,874 | 9/1990 | Hegedus | 52/79.5 |
| 5,108,122 | 4/1992 | Beagley | 296/21 |
| 5,135,277 | 8/1992 | Pearson | 296/21 |

FOREIGN PATENT DOCUMENTS 2100316 12/1982 United Kingdom ............ 52/7

*Primary Examiner*—Carl D. Friedman
*Assistant Examiner*—Wynn E. Wood
*Attorney, Agent, or Firm*—Ken J. Pedersen; Barbara S. Pedersen

[57] ABSTRACT

Various embodiments of a mobile display pavilion are shown and described. Each embodiment includes a trailer for being attached to a wheeled chassis and a vehicle having a door or doors that swing down to a slanted position against the ground, a support system on the inner surface of the door for receiving and displaying merchandiser and a latch for securing the door or doors when they are closed. The support system is preferably a series of steps that transforms the door or doors into a terraced platform. The pavilion is self-contained in terms of utilities and water and may be set up and folded away with a minimum of steps.

15 Claims, 4 Drawing Sheets

MOBILE DISPLAY PAVILION

BACKGROUND OF THE INVENTION

1. Technical Field

This invention relates generally to merchandise sales stands, and, more particularly, to stands that are compact and mobile for transport end that open up for merchandise display.

2. Background Art

Garden center, plant nursery, and produce retail is an area of business that could greatly benefit from a mobile display stand. Especially in cooler climates, the traditional garden center or fresh produce shop may have difficulty in making enough profit during the growing and gardening season to cover year-around expenses such as building maintenance, real estate mortgages, real estate taxes, advertising, and wages. In addition, it is especially difficult to support a stationary garden center in many rural areas, where the lack of population makes the growing season sales less lucrative. Such problems have limited the number of garden centers built in northern climates and in smaller towns. The garden center businessman with a mobile stand could overcome these problems by moving his business according to the seasons and weather and taking merchandise to any location having many prospective customers. Many other businesses could also greatly benefit from a mobile display stand. For example, a saddle and tack business could follow the workers and performers in a rodeo circuit. A recreational clothing business could travel to pares and resorts, or a craft business could follow the craft fair circuit.

Some designs for mobile stands are available, put each has one or more drawbacks. For example, some designs are inappropriate for secure and dust-free transport of merchandise or for attractive display of large volumes of merchandise. Some designs are complicated to set up and take down. Some designs are poorly equipped or poorly designed for salesman-customer interaction and consultation.

One type of mobile stand is the food concession stand commonly used at county fairs. Typically, these concession stands are cubicals on wheels with a window reaching down to about waist-level of the people inside the stand. One or more people usually serve food through the window or over a counter.

Another type of mobile stand is the portable stage for theater and concert productions. The stage in Berranger et al. (U.S. Pat. No. 4,720,945) is made of a central body, a rear body, and a front body, which slide apart to deepen into a theater stage. The front body has a rigid canopy, a sliding low floor, and two side floors that pivot out from between the chassis and the low floor to support the low floor. To set up the Berranger stage, numerous walls and floor extensions and the canopy must be slid and/or pivoted into position. The stage in Wenger, (U.S. Pat. No. 3,181,203) has multiple floor sections that are supported and connected by jacks and bracket elements. Setting up the Wenger stage requires numerous steps to slide, position, and bracket the floor sections and to pivot the canopy.

What is still needed for use in the gardening retail industry and in other industries is a mobile display and sales stand that is simple, efficient, and quick to set up for business and to fold up and secure for travel. The mobile display stand needs to provide a large surface area for attractive and easily-reachable display of merchandise. Also, what is needed is a mobile display stand that is self-contained with utilities and office equipment for use in locations that do not offer utility hookups or office facilities.

DISCLOSURE OF INVENTION

The present invention is a mobile display pavilion for transporting and displaying of sales merchandise or other objects. The pavilion comprises a trailer, a door, a support means on the door for receiving merchandise for display, and a latch means for securing the door.

The trailer is made mobile by attachment to a wheeled chassis and to a tractor or other vehicle. The trailer has an enclosure wall around an interior space that receives the merchandise during transport and also during display. The enclosure wall includes a floor, a roof, a front wall, a rear wall, and opposing first and second side walls. The side walls are preferably, but not necessarily, built of stud wall construction.

A doorway in the first side wall of the trailer extends generally from near the floor to near the roof. The door is attached by a hinge to the trailer near the bottom end of the doorway so that the door may swing up to cover the doorway and be secured by the latch means and may swing down to open the trailer for display and business. When open, the door lies at an acute angle to the ground, with its top edge resting on the ground. Therefore, the door inner surface faces generally upwards and outward when the door is open. A support means is located on the inner surface for receiving merchandise.

Preferably, the support means comprises steps attached to the inner surface so that a top surface of each step extends at an acute angle from the door that is generally similar to the acute angle between the open door and the ground. In this way, when the door is in the open position, each step top surface extends generally horizontal to the ground so that merchandise may be set on the steps but not necessarily tied or held down.

Preferably, there may be a plurality of doors, so that a side wall may open up in part or substantially along its entire length to provide a large area for display by creating a large terraced platform extending out from the trailer.

Preferably, an awning may be included for extending out over the terraced platform or for retracting against the trailer without blocking the doorways or doors. The roof of the trailer may be a flexible tarp that may be extended over the trailer or may be rolled to one side to open the roof of the trailer. Preferably, the pavilion may be self-contained in terms of utilities, water, and office equipment.

The invented pavilion is an extremely effective apparatus for creating a mobile business. The pavilion is quick and easy to set up for business, requiring only the parking of the trailer and the unlatching and lowering of a door or doors. The pavilion may be set up, operated, and folded away by as few as one or two people. The preferred rectangular shape and terraced platform of the pavilion maximizes the total inside and outside display area, and the ratio of inside to outside display area may be changed by opening or closing individual doors. The pavilion may be a self-contained business, but, as a vehicle without a permanent location, it offers distinct business advantages in terms of investment, taxes, maintenance, and operating expenses. The pavilion transports merchandise in a closed, dust-free, and wind-free environment and displays them in an attractive and prominent setting.

BEST MODE FOR CARRYING OUT INVENTION

Figure 1:
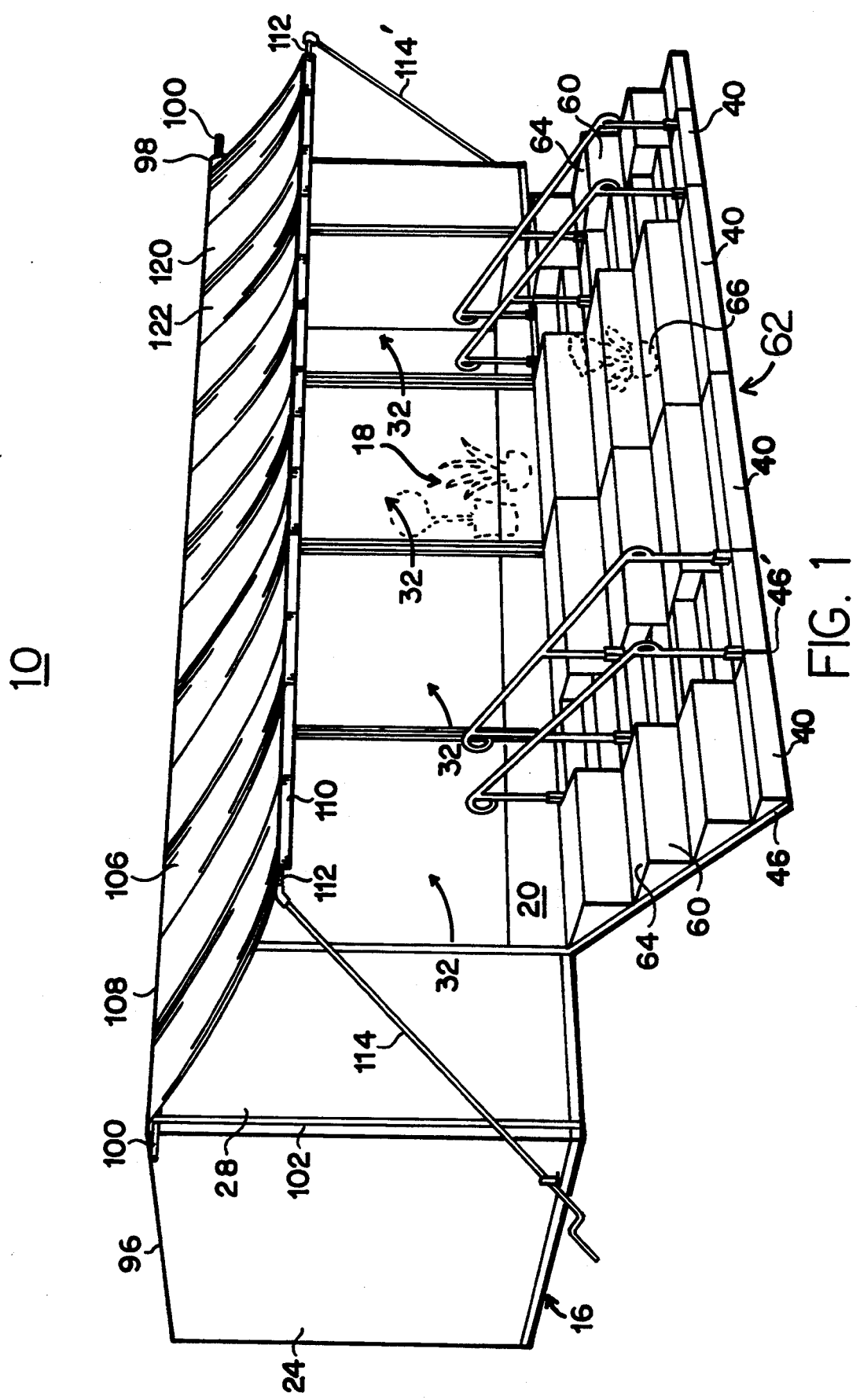
FIG. 1 is a perspective view of one embodiment of the invention.
Figure 2:
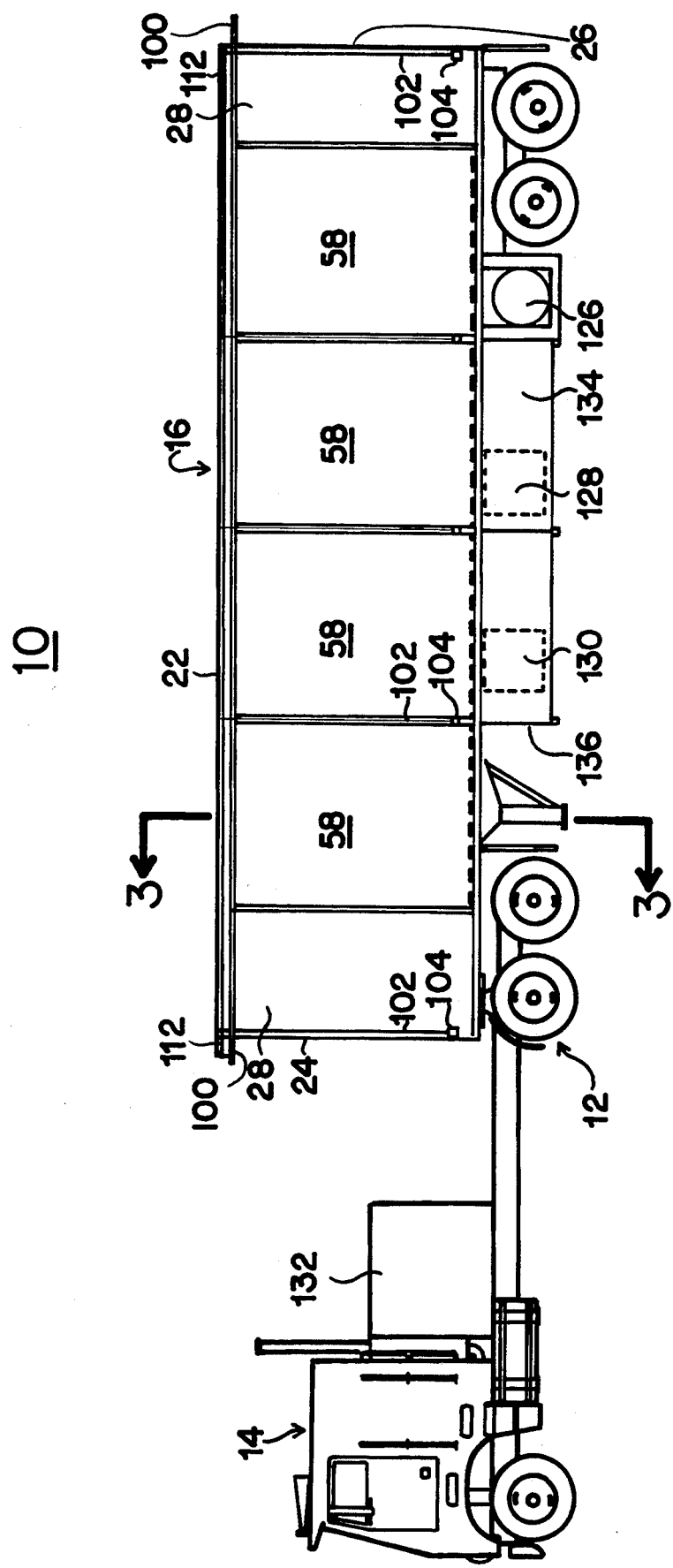
FIG. 2 is a side view of the embodiment of FIG. 1, with doors closed and awning retracted, and attached to a tractor.
Figure 3A:
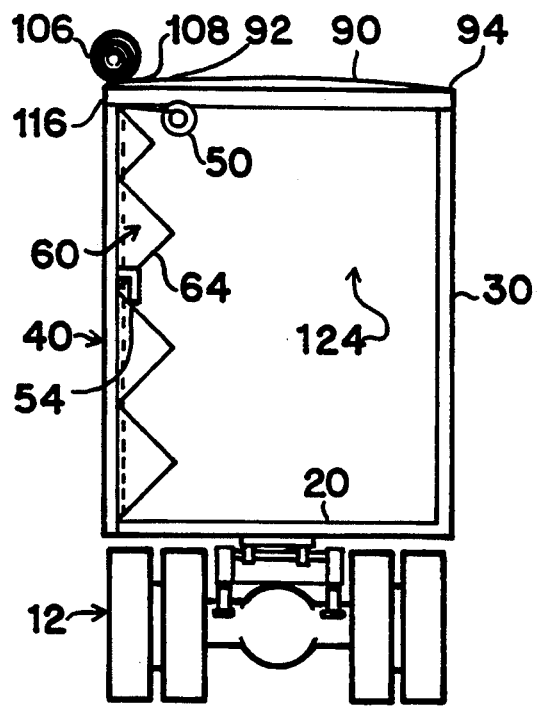
FIG. 3A is a rear cross-sectional view of the embodiment of FIG. 1, as viewed along the lines 3—3 in FIG. 2 and with the door closed and latched.
Figure 3B:
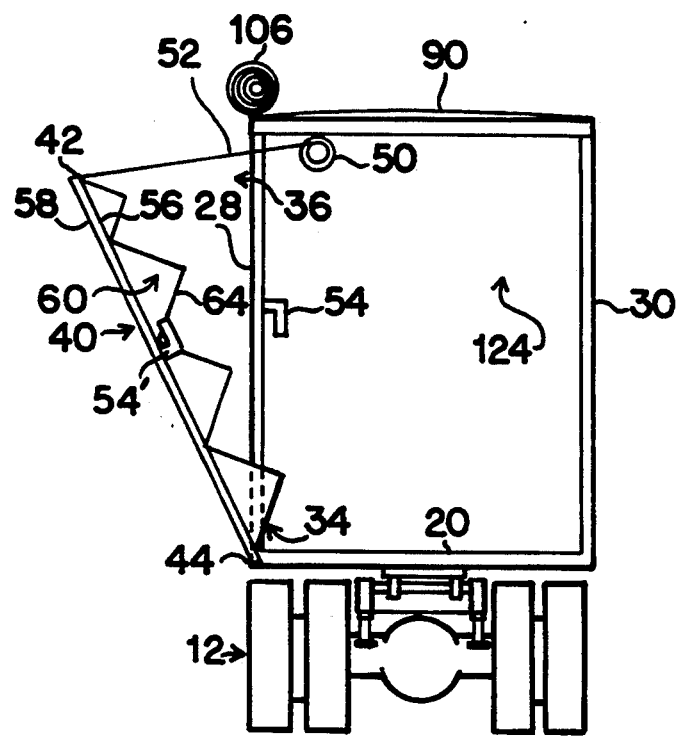
FIG. 3B shows the embodiment and view of FIG. 3A, except with the door partially open.
Figure 4:
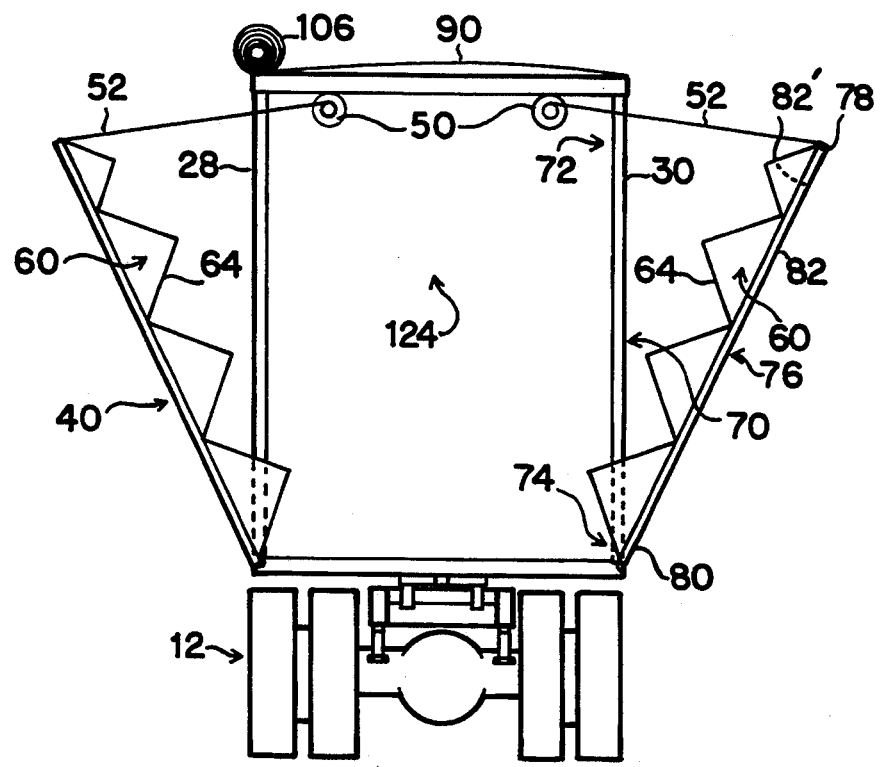
FIG. 4 is a rear cross-sectional view of another embodiment of the invention including doors on two sides of the trailer.
Figure 5:
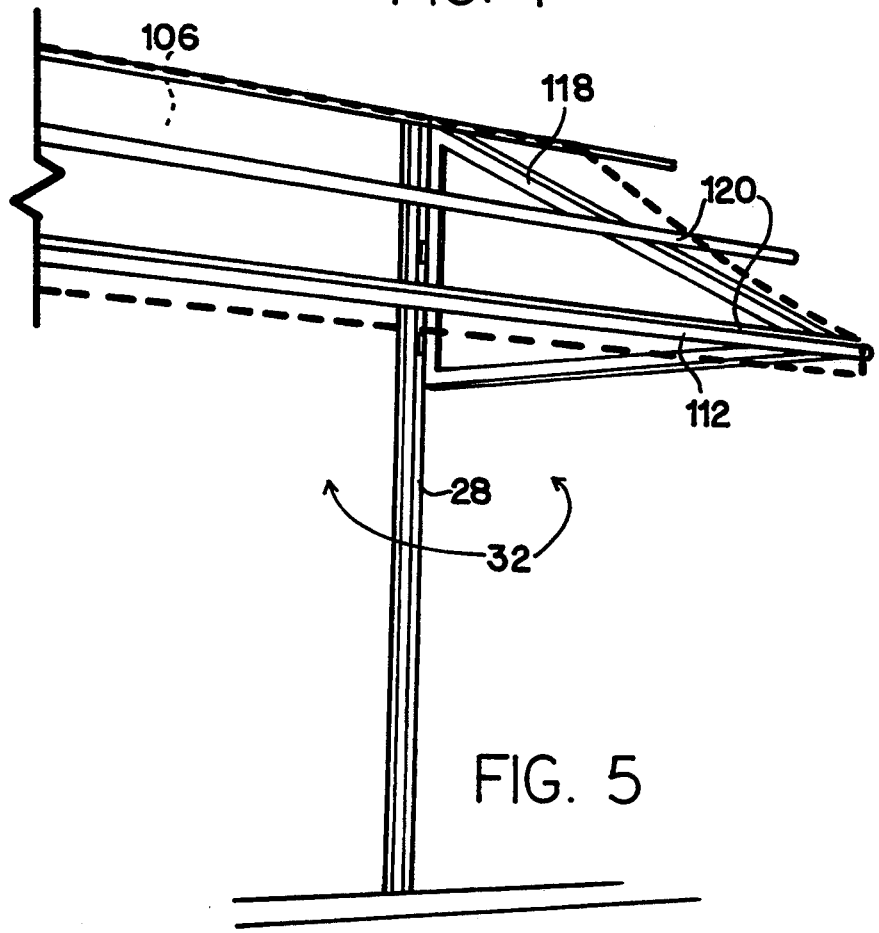
FIG. 5 is a detail of part of the frame underneath the extended awning tarp, which is shown in dashed lines.

Referring to FIGS. 1–5, there is shown the preferred but not the only embodiment of the mobile display pavilion 10. The pavilion 10 is attached to a wheeled chassis 12 and is pulled by a tractor 14 but may be parked and disconnected from the tractor 14. The preferred pavilion 10 is sized to be appropriate for highway travel and to be compatible with a tractor used in typical tractor-trailer combinations. Optionally, the pavilion 10 may be parked and connected to a second mobile pavilion to create a double-wide or double-length pavilion.

The trailer 16 has an interior space 18 surrounded and defined by an enclosure wall that includes a floor 20, roof 22, front wall 24, rear wall 26, and opposing first side wall 28 and second side wall 30. The first side wall 28 has a plurality of side-by-side doorways 32, each of which extends substantially along the entire height of the first side wall 28, with the bottom end 34 of each doorway 32 being near the floor 20 and the top end 36 of each doorway 32 being near the roof 22. Doors 40, having top edges 42, bottom edges 44, and two opposing side edges 46 and 46', are hinged at their bottom edges 44 to the trailer 16 near each of the doorways 32. Each door 40 may independently be swung up to a closed position to cover its respective doorway 32 or swung down to an open position to reach the ground. Electric winches 50 are included near the top ends 36 of the doorways 32 and detachably connected by cable 52 to the doors 40 for lowering and raising them. Alternatively, the doors 40 could be swung by hand, ropes, or other means. When closed, the doors 40 are secured by a latch means 54, which is preferably lockable for the outside or reachable only from the interior space 18 of the trailer 16 after access through a lockable, traditional door in the rear wall 26.

When open, the doors 40 rest on their top edges 42 on the ground, with the door inner surfaces 56 facing generally upward and the outer surfaces 58 facing generally downward toward the ground. The door top edge 42 serves as a strong, long, continuous support for the door 40 and the heavy merchandise 66. Thus, each door 40 is slanted between the floor 20 of the trailer 16 and the ground at an acute angle to the ground. In the preferred embodiment, the acute angle is approximately 30°, but this angle may vary depending on the length of the doors 40 and the distance between the hinged bottom edge 44 of the door 40 and the ground.

Attached to each door 40 at the door inner surface 56 is a plurality of steps 60, which extend substantially all the way from the door bottom edge 44 to the door top edge 42 to transform the door inner surfaces 56 into a terraced platform. The top surface 64 of each step 60 extends from the door 40 at an acute angle to the door 40 that is generally similar to the acute angle of the door 40 to the ground, which was noted earlier as about 30°. This configuration places the step top surfaces 64 generally horizontal when the door 40 is open so that merchandise 66 may set on the steps 60 without being tied or latched. Thus, the steps 60 are a support means for holding merchandise 66 on the doors 40.

The steps 60 and door 40 are made of steel and sturdy aluminum material and include bracing and reinforcement necessary to support thousands of pounds of merchandise 66. The steps 60 are approximately 14 inch steps, in the preferred embodiment, and so they take up little space inside the trailer 16 when closed. Alternative support means may be used, but the preferred designs are ones that are strong enough to receive merchandise 66 along substantially the entire inner surface 56 of the door 40 and without time-consuming or complicated positioning or attachment. For example, steps with a lip or indented holders could be used to keep merchandise 66 in place. A series of upending lips could be used instead of steps 60 for merchandise 66 that does not particularly need to be horizontal.

The open doors 40 are preferably very close together, preferably being less than about 3 inches apart at their side edges 46 and 46'. This close spacing results in a large, substantially continuous terraced platform being formed by the doors 60 and helps prevent merchandise 66 or a persons foot from falling in between the doors 40. Optionally, a door 40 or a section of a door may have steps 60 and a detachable handrail 68 that are sized to be a comfortable stairway for people wishing to enter the trailer interior space 18. Optionally, another entryway may be designed in the trailer enclosure wall, such as a traditional door in the rear wall.

The preferred pavilion 10 has four doors 40 on the first side 28 of the trailer 16, so that substantially all, or more than about 70%, of that side may be opened up for display. Alternatively, designs for a different number of doors 40 or arrangement of doors 40 may be used, including a design for only one door 40 or a design for a larger spacing between doorways 32. Another alternative is to design the pavilion 10 with doorways 32 and doors 40 on two or more walls of the trailer. For example, doorways and doors could be placed on both the first and second side walls or on one side wall and the rear wall. Such a second-side doorway 70 has a top end 72 and bottom end 74 and such a second-side door 76 has a top edge 78, a bottom edge 80, and two opposing side edges 82 and 82'. In the preferred embodiment, however, the second side wall 30 is reserved for decorative and informative indicia advertising the pavilion business and optionally for an opening that could lead to another pavilion for a doublewide configuration. The use of the terms "first side" and "second side" are intended only to help in the clear description of the invention but are not intended to limit the doors to being on either the left or right side of the trailer.

In the preferred embodiment, the roof 22 is a flexible roof tarp 90 that has a first edge 92, an opposing second edge 94, a front edge 96 and a rear edge 98 for extending to reach the first side wall 28, second side wall 30, front wall 24, and rear wall 26, respectively. The second edge 94 is connected to the second side wall 30 and the other three edges of the roof tarp 90 are unattached so that the roof tarp 90 may be rolled or pulled toward the second edge to 94 uncover the trailer 16. A biasing bar 100 runs across and is connected to the roof tarp 90 near its first edge 92, and straps 102 are connected to the biasing bar 100 and run down the trailer first side wall 28 to hand-winches 104 that are attached to the first side wall 28. These hand-winches 104 are manually operated pull and lock the straps 102, which in turn pull the biasing bar 100 to keep the roof tarp 90 taut across the trailer 16. Thus, the biasing bar 100, straps 102, and hand-winches 104 act as a biasing means for releasably keeping the roof tarp 90 first edge 92 in an extended position across the trailer 16. Additional beams under the extended roof tarp 90 act as structural members for the trailer 16 and as support members for the roof tarp 90.

The preferred embodiment also has an optional awning for extension out from the trailer 16 over the terraced platform 62 or for retraction close to the trailer 16. The preferred awning has a flexible awning tarp 106 that has a first edge 108 connected to the first edge 92 of the roof tarp 90, and an opposing second edge 110 connected to an extension bar 112. The extension bar 112 is connected to handles 114 and 114' that may be removably fastened to the front wall 24 and the rear wall 26 to securely hold the awning tarp 106 in the extended position. The handles 114 and 114' may be unfastened from the front wall 24 and rear wall 26 and operated to roll up the awning tarp 106 around the extension bar 112 for retraction to a position near the corner 116 joining the roof 20 and the first side wall 28. When retracted, the awning does not block or interfere with the doors 40 or doorways 32. A frame made of triangular support wings 118 and crossbars 120 is removably installed on the first side wall 28 of the trailer in between the doorways 32 to support the awning tarp when it is extended. Thus, the extension bar 112, handles 114 and 114', and frame act as a releasable extension means for extending the awning tarp 106.

In the preferred embodiment, the roof tarp 90 and awning tarp 106 are made from the same continuous piece of material, which is a canvas having alternating translucent sections 120 and opaque sections 122. These sections give a reduced sunlight or partial sun/partial shade effect that has been found advantageous for sustaining healthy plants and trees. The preferred canvas has about a 55/45 ratio of translucent/opaque sections 120 and 122, which has been found to be particularly beneficial to a variety of plants, but other ratios could be used. The partially translucent roof tarp 90 allows a mobile garden center to transport live plants inside the trailer 16 without degenerating their health. The retractable roof tarp 90 feature allows the roof 22 to be opened up during a stop along the road to adjust the temperature or humidity in the trailer interior space 18 or during normal business operation to let in more sunlight. The roof 22 and awning design make the pavilion 10 suitable for rainy-day use, as they do not trap water or let water through to the merchandise 66.

The preferred trailer enclosure wall includes stud wall construction, which places the structural support studs on the inside of smooth outer surfaces. Paneling, signs, cabinets, or other display surfaces may be installed on the inside of the studs, and wiring, ducting, or other materials may extend through the stud walls to be hidden in an attractive manner. Steel and aluminum construction makes the trailer and doors light-weight and durable. The pavilion 10 may be custom made or may be a retrofit into an existing tractor-trailer combination.

An office partition wall and door may be optionally included inside the trailer 16 at the front end 124 to provide a lockable office. The preferred office includes a fold-down writing and drafting table, a lockable cash drawer, a hot water-equipped sink, cellular phone and fax, and a music system for broadcasting music into and around the trailer.

The pavilion 10 is preferably self-contained for operation without requiring hookup to an electrical or water source, but also has optional hookups for use when outside electricity and water are available. A tank 126 for propane or other fuel, propane-powered electricity generator 128, a propane-powered furnace 130 and blower, electric lights, and heat ducts are included. A water pump, water heater, and water storage tank 132 are included. The water tank 132 is preferably attached to the tractor 14 so that it can be driven away for filling without moving the trailer 16. The propane tank 126, generator 128, furnace 130, blower, and additional storage space 134 are preferably located in a reinforced undercarriage 136 below the trailer floor 20. Optional refrigeration equipment may be included and powered by the generator 128, for storing fresh produce, for example.

While there is shown and described the present preferred embodiment of the invention, it is to be distinctly understood that this invention is not limited thereto but may be variously embodied to practice within the scope of the following claims.

I claim:

1. A mobile pavilion for attachment to a wheeled chassis for transporting and displaying merchandise, the mobile pavilion comprising:
    a trailer for lying on and being attached to the wheeled chassis, the trailer having an enclosure wall defining an interior space for receiving the merchandise, the enclosure wall comprising a floor, a roof, a front wall, a rear wall, and opposing first and second side walls, the first side wall having a doorway with a bottom end located near the floor and a top end near the roof,
    a door having an inner surface, an outer surface, a bottom edge, a top edge, and two opposing side edges, the door being hinged at its bottom edge to the trailer near the bottom end of the doorway so that the door may swing up to a closed position across the doorway with the inner surface facing the trailer interior space and swing down to an open position for resting the door top edge on the ground to position the door at an acute angle relative to the ground,
    a support means attached to the inner surface of the door for receiving the merchandise when the door is in the open position, the support means comprising a plurality of steps attached to the inner surface of the door, each step having a top surface that is generally horizontal when the door is in the open position for receiving the merchandise, and
    a latch means for detachably securing the door in the closed position.

2. A mobile pavilion as set forth in claim 1, further comprising a plurality of said doorways and a plurality of said doors, each door for being swung open and closed independently of the other doors.

3. A mobile pavilion as set forth in claim 2, wherein the support means comprises a plurality of steps attached to the inner surface of each door, each step having a top surface that is generally horizontal when the door is in the open position for receiving the merchandise.

4. A mobile pavilion as set forth in claim 2, wherein the doorways and doors extend across substantially the entire first side wall.

5. A mobile pavilion as set forth in claim 1, wherein the second side wall has a second-side doorway with a bottom end located near the floor and a top end near the roof, and wherein the trailer further comprises:

a second-side door having an inner surface, an outer surface, a bottom edge, a top edge, and two opposing side edges, the second-side door being hinged at its bottom edge to the trailer near the bottom end of the second-side doorway so that the second-side door may swing up to a closed position across the second-side doorway with the inner surface facing the trailer interior space and swing down to an open position for resting the second-side door top edge on the ground to position the second-side door at an acute angle relative to the ground, a support means attached to the inner surface of the second-side door for receiving the merchandise when the second-side door is in the open position, and a latch means for detachably securing the door in the closed position.

6. A mobile pavilion as set forth in claim 5, wherein the support means comprises a plurality of steps attached to the inner surface of the second-side door, each step having a top surface that is generally horizontal when the second-side door is in the open position for receiving the merchandise.

7. A mobile pavilion as set forth in claim 1, further comprising a retractable awning having opposing first and second edges and an extension means, the first edge being connected to the trailer near the first side wall and near the roof, and the extension means being for releasably extending and holding the second edge out away from the trailer and for retracting and holding the second edge close to the trailer without blocking the doorway.

8. A mobile pavilion as set forth in claim 1, wherein the roof comprises a retractable flexible roof tarp and a biasing means, the roof tarp having opposing first and second edges and the second edge being attached to the second side wall of the trailer, and the biasing means being for releasably biasing the first edge to extend toward the first side wall to cover the trailer.

9. A mobile pavilion as set forth in claim 7, wherein the awning tarp comprises both translucent sections and opaque sections for controlling the amount of sunlight penetrating through the awning.

10. A mobile pavilion as set forth in claim 8, wherein the roof tarp comprises both translucent sections and opaque sections for controlling the amount of sunlight penetrating through the roof into the interior space of the trailer.

11. A mobile pavilion for attachment to a wheeled chassis for transporting and displaying merchandise. the mobile pavilion comprising:

a trailer for lying on and being attached to the wheeled chassis, the trailer having an enclosure wall defining an interior space for receiving the merchandise, the enclosure wall comprising a floor, a roof, a front wall, a rear wall, and opposing first and second side walls, the roof comprising a retractable flexible roof tarp and a biasing means, the roof tarp having opposing first and second edges, the second edge being attached to the second side wall of the trailer and the biasing means being for releasably biasing the first edge to extend toward the first side wall to cover the trailer, and the first side wall of the trailer having a plurality of doorways extending across substantially the entire first side wall, each doorway with a bottom end located near the floor and a top end near the roof, a plurality of doors, each being for cooperation with a respective one of said doorways, each door having an inner surface, an outer surface, a bottom edge, a top edge, and two opposing side edges, each door being hinged at its bottom edge to the trailer near the bottom end of the respective doorway so that each door may swing up to a closed position across the respective doorway with the inner surface facing the trailer interior space and swing down to an open position for resting the door top edge on the ground to position the door at an acute angle relative to the ground, a plurality of steps attached to the inner surface of each door, each step having a top surface that is generally horizontal when the door is in the open position for receiving the merchandise, a latch means for detachably securing each door in the closed position, and a retractable awning having a flexible awning tarp with opposing first and second edges and having an extension means, the first edge of the awning tarp being connected to the first edge of the roof tarp and the extension means being for releasably extending and holding the second edge of the awning tarp out away from the trailer and for retracting and holding the second edge close to the trailer without blocking the doorways.

12. A mobile pavilion as set forth in claim 11, wherein the doors are less than about 3 inches apart at the door side edges when the doors are in the open position.

13. A mobile pavilion as set forth in claim 11, wherein the trailer enclosure wall is of stud wall type construction.

14. A mobile pavilion as set forth in claim 11, further comprising a fuel tank and a fuel-powered electricity generator for supplying the pavilion with electricity.

15. A mobile pavilion as set forth in claim 11, further comprising a fuel-powered furnace for heating the pavilion.

* * * * *